US012302071B2

(12) United States Patent
Link et al.

(10) Patent No.: US 12,302,071 B2
(45) Date of Patent: *May 13, 2025

(54) HEARING AID ADAPTED FOR EMBEDDED ELECTRONICS

(71) Applicant: Starkey Laboratories, Inc., Eden Prairie, MN (US)

(72) Inventors: Douglas F. Link, Plymouth, MN (US); David Prchal, Hopkins, MN (US); Sidney A. Higgins, Maple Grove, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,967

(22) Filed: Aug. 8, 2023

(65) Prior Publication Data

US 2024/0031748 A1 Jan. 25, 2024

Related U.S. Application Data

(63) Continuation of application No. 17/372,745, filed on Jul. 12, 2021, now Pat. No. 11,765,531, which is a continuation of application No. 16/599,524, filed on Oct. 11, 2019, now Pat. No. 11,064,304, which is a continuation of application No. 16/058,335, filed on Aug. 8, 2018, now Pat. No. 10,448,176, which is a (Continued)

(51) Int. Cl.
*H04R 25/00* (2006.01)

(52) U.S. Cl.
CPC ......... *H04R 25/609* (2019.05); *H04R 25/604* (2013.01); *H04R 25/65* (2013.01); *H04R 25/603* (2019.05)

(58) Field of Classification Search
CPC .... H04R 25/609; H04R 25/604; H04R 25/65; H04R 25/603
See application file for complete search history.

(56) References Cited

U.S. PATENT DOCUMENTS 2,327,320 A 8/1943 Shapiro
3,728,509 A 4/1973 Shimojo (Continued)

FOREIGN PATENT DOCUMENTS

DE 1247402 8/1967
DE 3006235 A1 10/1980

(Continued)

OTHER PUBLICATIONS

"U.S. Appl. No. 10/894,576, Non-Final Office Action mailed Jul. 2, 2007", 12 pgs.

(Continued)

*Primary Examiner* — Sunita Joshi
(74) *Attorney, Agent, or Firm* — Schwegman Lundberg & Woessner, P.A.

(57) ABSTRACT

A hearing aid comprising a microphone, a receiver, hearing aid electronics coupled to the microphone and the receiver, and conductive traces overlaying an insulator, the conductive traces configured to interconnect the hearing aid electronics and to follow non-planar contours of the insulator. Examples are provided wherein the insulator includes a hearing aid housing.

20 Claims, 3 Drawing Sheets

Related U.S. Application Data continuation of application No. 15/595,302, filed on May 15, 2017, now Pat. No. 10,051,390, which is a continuation of application No. 14/257,537, filed on Apr. 21, 2014, now Pat. No. 9,654,887, which is a continuation of application No. 12/539,195, filed on Aug. 11, 2009, now Pat. No. 8,705,785.

(60) Provisional application No. 61/087,899, filed on Aug. 11, 2008.

(56) References Cited

U.S. PATENT DOCUMENTS

| | | | |
|---|---|---|---|
| 3,812,300 | A | 5/1974 | Brander et al. |
| 4,017,834 | A | 4/1977 | Cuttill et al. |
| 4,310,213 | A | 1/1982 | Fetterolf, Sr. et al. |
| 4,564,955 | A | 1/1986 | Birch et al. |
| 4,571,464 | A | 2/1986 | Segero |
| 4,729,166 | A | 3/1988 | Lee et al. |
| 4,756,312 | A | 7/1988 | Epley |
| 5,606,621 | A | 2/1997 | Reiter et al. |
| 5,640,457 | A | 6/1997 | Gnecco et al. |
| 5,687,242 | A | 11/1997 | Iburg |
| 5,708,720 | A | 1/1998 | Meyer |
| 5,740,261 | A | 4/1998 | Loeppert et al. |
| 5,755,743 | A | 5/1998 | Volz et al. |
| 5,802,183 | A | 9/1998 | Scheller et al. |
| 5,824,968 | A | 10/1998 | Packard et al. |
| 5,825,894 | A | 10/1998 | Shennib |
| 5,906,635 | A | 5/1999 | Maniglia |
| 5,987,146 | A | 11/1999 | Pluvinage et al. |
| 6,031,923 | A | 2/2000 | Gnecco et al. |
| 6,167,138 | A | 12/2000 | Shennib |
| 6,563,045 | B2 | 5/2003 | Goett et al. |
| 6,766,030 | B1 | 7/2004 | Chojar |
| 6,876,074 | B2 | 4/2005 | Kim |
| 6,985,598 | B1 | 1/2006 | Joschika |
| 7,003,127 | B1 | 2/2006 | Sjursen et al. |
| 7,016,512 | B1 | 3/2006 | Feeley et al. |
| 7,065,224 | B2 | 6/2006 | Cornelius et al. |
| 7,110,562 | B1 | 9/2006 | Feeley et al. |
| 7,139,404 | B2 | 11/2006 | Feeley et al. |
| 7,142,682 | B2 | 11/2006 | Mullenborn et al. |
| 7,181,035 | B2 | 2/2007 | Van Halteren et al. |
| 7,256,747 | B2 | 8/2007 | Victorian et al. |
| 7,320,832 | B2 | 1/2008 | Palumbo et al. |
| 7,354,354 | B2 | 4/2008 | Palumbo et al. |
| 7,446,720 | B2 | 11/2008 | Victorian et al. |
| 7,460,681 | B2 | 12/2008 | Geschiere et al. |
| 7,471,182 | B2 | 12/2008 | Kumano et al. |
| 7,593,538 | B2 | 9/2009 | Polinske |
| 7,720,244 | B2 | 5/2010 | Espersen et al. |
| 8,098,863 | B2 | 1/2012 | Ho et al. |
| 8,103,039 | B2 | 1/2012 | Van Halteren et al. |
| 8,116,495 | B2 | 2/2012 | Spaulding |
| 8,259,975 | B2 | 9/2012 | Bally et al. |
| 8,295,517 | B2 | 10/2012 | Gottschalk et al. |
| 8,385,573 | B2 | 2/2013 | Higgins |
| 8,494,195 | B2 | 7/2013 | Higgins |
| 8,638,965 | B2 | 1/2014 | Higgins et al. |
| 8,705,785 | B2 | 4/2014 | Link et al. |
| 8,781,141 | B2 | 7/2014 | Higgins et al. |
| 8,798,299 | B1 | 8/2014 | Higgins et al. |
| 8,861,761 | B2 | 10/2014 | Higgins |
| 8,908,895 | B2 | 12/2014 | Würfel |
| 9,049,526 | B2 | 6/2015 | Higgins |
| 9,654,887 | B2 | 5/2017 | Link et al. |
| 9,693,154 | B2 | 6/2017 | Higgins et al. |
| 10,051,390 | B2 | 8/2018 | Link et al. |
| 10,257,622 | B2 | 4/2019 | Higgins et al. |
| 10,448,176 | B2 | 10/2019 | Link et al. |
| 10,674,286 | B2 | 6/2020 | Higgins et al. |
| 11,064,304 | B2 | 7/2021 | Link et al. |
| 11,252,521 | B2 | 2/2022 | Higgins et al. |
| 11,711,660 | B2 | 7/2023 | Higgins et al. |
| 11,765,531 | B2 | 9/2023 | Link et al. |
| 2001/0033664 | A1 | 10/2001 | Poux et al. |
| 2002/0027996 | A1 | 3/2002 | Leedom et al. |
| 2002/0061113 | A1 | 5/2002 | van Halteren et al. |
| 2002/0074633 | A1 * | 6/2002 | Larson .................... H01L 25/16 257/E25.029 |
| 2002/0131614 | A1 | 9/2002 | Jakob et al. |
| 2003/0152243 | A1 | 8/2003 | Julstrom et al. |
| 2003/0178247 | A1 | 9/2003 | Saltykov |
| 2003/0200820 | A1 | 10/2003 | Takad et al. |
| 2004/0010181 | A1 | 1/2004 | Feeley et al. |
| 2004/0028251 | A1 | 2/2004 | Kasztelan et al. |
| 2004/0114776 | A1 | 6/2004 | Crawford et al. |
| 2004/0240693 | A1 | 12/2004 | Rosenthal |
| 2005/0008178 | A1 | 1/2005 | Joergensen et al. |
| 2005/0111685 | A1 | 5/2005 | Gabathuler |
| 2006/0007376 | A1 | 1/2006 | Fukuda et al. |
| 2006/0008110 | A1 | 1/2006 | Van Halteren |
| 2006/0018495 | A1 | 1/2006 | Geschiere et al. |
| 2006/0078142 | A1 | 4/2006 | Neilson |
| 2006/0097376 | A1 | 5/2006 | Leurs et al. |
| 2006/0159298 | A1 | 7/2006 | Von Dombrowski et al. |
| 2006/0227989 | A1 | 10/2006 | Polinske |
| 2007/0009130 | A1 | 1/2007 | Feeley et al. |
| 2007/0014423 | A1 | 1/2007 | Darbut et al. |
| 2007/0036374 | A1 | 2/2007 | Bauman et al. |
| 2007/0121979 | A1 | 5/2007 | Zhu et al. |
| 2007/0147630 | A1 | 6/2007 | Chiloyan |
| 2007/0173683 | A1 | 7/2007 | Harrison et al. |
| 2007/0188289 | A1 | 8/2007 | Kumano et al. |
| 2007/0248234 | A1 | 10/2007 | Ho et al. |
| 2008/0003736 | A1 | 1/2008 | Arai et al. |
| 2008/0013766 | A1 * | 1/2008 | Kral .................... H04R 25/604 381/324 |
| 2008/0026220 | A9 | 1/2008 | Bi et al. |
| 2008/0081492 | A1 | 4/2008 | Sawatari et al. |
| 2008/0187157 | A1 * | 8/2008 | Higgins ................. H04R 25/00 381/314 |
| 2008/0199971 | A1 | 8/2008 | Tondra |
| 2008/0260193 | A1 | 10/2008 | Westermann et al. |
| 2009/0067661 | A1 | 3/2009 | Keady et al. |
| 2009/0074218 | A1 | 3/2009 | Higgins |
| 2009/0075083 | A1 | 3/2009 | Bi et al. |
| 2009/0196444 | A1 | 8/2009 | Solum |
| 2009/0245558 | A1 | 10/2009 | Spaulding |
| 2009/0252365 | A1 | 10/2009 | Lin |
| 2009/0262964 | A1 | 10/2009 | Havenith et al. |
| 2010/0034410 | A1 | 2/2010 | Douglas et al. |
| 2010/0074461 | A1 | 3/2010 | Polinske |
| 2010/0124346 | A1 | 5/2010 | Higgins |
| 2010/0135513 | A1 | 6/2010 | Geschiere et al. |
| 2010/0158291 | A1 | 6/2010 | Polinske et al. |
| 2010/0158293 | A1 | 6/2010 | Polinske et al. |
| 2010/0158295 | A1 | 6/2010 | Polinske et al. |
| 2011/0044485 | A1 | 2/2011 | Lin et al. |
| 2012/0014549 | A1 | 1/2012 | Higgins et al. |
| 2012/0263328 | A1 | 10/2012 | Higgins |
| 2013/0230197 | A1 | 9/2013 | Higgins |
| 2014/0355803 | A1 | 12/2014 | Higgins et al. |
| 2015/0086051 | A1 | 3/2015 | Link et al. |
| 2015/0163601 | A1 | 6/2015 | Higgins |
| 2017/0318402 | A1 | 11/2017 | Link et al. |
| 2017/0359662 | A1 | 12/2017 | Higgins et al. |
| 2018/0352347 | A1 | 12/2018 | Link et al. |
| 2019/0335280 | A1 | 10/2019 | Higgins et al. |
| 2020/0154219 | A1 | 5/2020 | Link et al. |
| 2020/0366997 | A1 | 11/2020 | Higgins et al. |
| 2022/0007119 | A1 | 1/2022 | Link et al. |
| 2022/0248151 | A1 | 8/2022 | Higgins et al. |
| 2023/0388727 | A1 | 11/2023 | Higgins et al. |

FOREIGN PATENT DOCUMENTS

| | | | |
|---|---|---|---|
| DE | 3502178 | A1 | 8/1985 |
| DE | 3643124 | A1 | 7/1988 |
| DE | 4005476 | A1 | 7/1991 |
| DE | 9320391 | U1 | 9/1993 |
| DE | 4233813 | C1 | 11/1993 |
| DE | 9408054 | U1 | 5/1994 |

(56) References Cited

FOREIGN PATENT DOCUMENTS

| | | | |
|---|---|---|---|
| DE | 29801567 | U1 | 5/1998 |
| DE | 102008045668 | A1 | 9/2008 |
| EP | 0339877 | A3 | 11/1989 |
| EP | 0424916 | B1 | 7/1995 |
| EP | 0866637 | A2 | 9/1998 |
| EP | 1065863 | A2 | 1/2001 |
| EP | 1209948 | A2 | 5/2002 |
| EP | 1465457 | A2 | 10/2004 |
| EP | 1496530 | A2 | 1/2005 |
| EP | 1209948 | A3 | 7/2006 |
| EP | 1811808 | A1 | 7/2007 |
| EP | 1816893 | A1 | 8/2007 |
| EP | 1850630 | A2 | 10/2007 |
| EP | 1916561 | A2 | 4/2008 |
| EP | 1916561 | A3 | 4/2008 |
| EP | 1920634 | B1 | 2/2009 |
| EP | 2040343 | A1 | 3/2009 |
| EP | 2107829 | B1 | 5/2012 |
| EP | 2509341 | A1 | 10/2012 |
| EP | 2160047 | B1 | 10/2013 |
| EP | 2509341 | B1 | 6/2014 |
| GB | 1298089 | | 11/1972 |
| GB | 1522549 | | 8/1978 |
| GB | 1522549 | B3 | 8/1978 |
| JP | 2209967 | A | 8/1990 |
| JP | 2288116 | A | 11/1990 |
| JP | 09199662 | A | 7/1997 |
| WO | WO-9741710 | A1 | 11/1997 |
| WO | WO-0079832 | A2 | 12/2000 |
| WO | WO-0143497 | A1 | 6/2001 |
| WO | WO-2004025990 | A1 | 3/2004 |
| WO | WO-06094502 | A1 | 9/2006 |
| WO | WO-2006094502 | A1 | 9/2006 |
| WO | WO-2007027152 | A1 | 3/2007 |
| WO | WO-2007112404 | A2 | 10/2007 |
| WO | WO-2007112404 | A3 | 10/2007 |
| WO | WO-2007140403 | A2 | 12/2007 |
| WO | WO-2007140403 | A3 | 12/2007 |
| WO | WO-2007148154 | A1 | 12/2007 |
| WO | WO-2008092265 | A1 | 8/2008 |
| WO | WO-2008097600 | A1 | 8/2008 |
| WO | WO-2008097600 | C1 | 8/2008 |
| WO | WO-2011101041 | A1 | 8/2011 |

OTHER PUBLICATIONS

"U.S. Appl. No. 10/894,576, Non-Final Office Action mailed Dec. 18, 2007", 11 pgs.
"U.S. Appl. No. 10/894,576, Notice of Allowance mailed Aug. 5, 2008", 7 pgs.
"U.S. Appl. No. 10/894,576, Response filed Apr. 18, 2008 to Non-Final Office Action mailed Dec. 18, 2007", 10 pgs.
"U.S. Appl. No. 10/894,576, Response filed Oct. 1, 2007 to Non-Final Office Action mailed Jul. 2, 2007", 10 pgs.
"U.S. Appl. No. 11/857,439, Final Office Action mailed Feb. 29, 2012", 16 pgs.
"U.S. Appl. No. 11/857,439, Non Final Office Action mailed Aug. 17, 2011", 16 pgs.
"U.S. Appl. No. 11/857,439, Notice of Allowance mailed May 30, 2012", 9 pgs.
"U.S. Appl. No. 11/857,439, Notice of Allowance mailed Sep. 19, 2012", 9 pgs.
"U.S. Appl. No. 11/857,439, Response filed Apr. 30, 2012 to Final Office Action mailed Feb. 29, 2012", 9 pgs.
"U.S. Appl. No. 11/857,439, Response filed Jun. 13, 2011 to Restriction Requirement mailed May 11, 2011", 8 pgs.
"U.S. Appl. No. 11/857,439, Response filed Dec. 17, 2011 to Non Final Office Action mailed Aug. 17, 2011", 12 pgs.
"U.S. Appl. No. 11/857,439, Restriction Requirement mailed May 11, 2011", 6 pgs.
"U.S. Appl. No. 12/027,173, Final Office Action mailed Dec. 8, 2011", 12 pgs.
"U.S. Appl. No. 12/027,173, Non Final Office Action mailed Jul. 11, 2011", 10 pgs.
"U.S. Appl. No. 12/027,173, Non Final Office Action mailed Jul. 27, 2012", 11 pgs.
"U.S. Appl. No. 12/027,173, Notice of Allowance mailed Mar. 19, 2013", 8 pgs.
"U.S. Appl. No. 12/027,173, Response filed Jun. 8, 2012 to Final Office Action mailed Dec. 8, 2011", 7 pgs.
"U.S. Appl. No. 12/027,173, Response filed Nov. 14, 2011 to Non Final Office Action mailed Jul. 11, 2011", 8 pgs.
"U.S. Appl. No. 12/027,173, Response filed Dec. 26, 2012 to Non Final Office Action mailed Jul. 27, 2012", 8 pgs.
"U.S. Appl. No. 12/059,578, Notice of Allowance mailed Oct. 5, 2011", 8 pgs.
"U.S. Appl. No. 12/325,838, Non Final Office Action mailed Jun. 16, 2011", 5 pgs.
"U.S. Appl. No. 12/539,195, Advisory Action mailed Apr. 23, 2013", 3 pgs.
"U.S. Appl. No. 12/539,195, Final Office Action mailed Feb. 11, 2013", 15 pgs.
"U.S. Appl. No. 12/539,195, Non Final Office Action mailed Jul. 20, 2012", 13 pgs.
"U.S. Appl. No. 12/539,195, Non Final Office Action mailed Aug. 2, 2013", 14 pgs.
"U.S. Appl. No. 12/539,195, Notice of Allowance mailed Nov. 29, 2013", 12 pgs.
"U.S. Appl. No. 12/539,195, Response filed Apr. 11, 2013 to Final Office Action mailed Feb. 11, 2013", 7 pgs.
"U.S. Appl. No. 12/539,195, Response filed Nov. 4, 2013 to Non Final Office Action mailed Aug. 2, 2013", 7 pgs.
"U.S. Appl. No. 12/539,195, Response filed Dec. 20, 2012 to Non Final Office Action mailed Jul. 20, 2012", 7 pgs.
"U.S. Appl. No. 12/548,051, Final Office Action mailed Apr. 19, 2012", 12 pgs.
"U.S. Appl. No. 12/548,051, Non Final Office Action mailed Jan. 24, 2013", 12 pgs.
"U.S. Appl. No. 12/548,051, Non Final Office Action mailed Oct. 12, 2011", 11 pgs.
"U.S. Appl. No. 12/548,051, Notice of Allowance mailed Jul. 31, 2013", 14 pgs.
"U.S. Appl. No. 12/548,051, Response filed Jan. 12, 2012 to Non Final Office Action mailed Oct. 12, 2011", 9 pgs.
"U.S. Appl. No. 12/548,051, Response filed Apr. 24, 2013 to Non Final Office Action mailed Jan. 24, 2013", 8 pgs.
"U.S. Appl. No. 12/548,051, Response filed Sep. 19, 2012 to Final Office Action mailed Apr. 19, 2012", 8 pgs.
"U.S. Appl. No. 12/644,188, Advisory Action mailed Jul. 25, 2013", 3 pgs.
"U.S. Appl. No. 12/644,188, Final Office Action mailed May 22, 2013", 7 pgs.
"U.S. Appl. No. 12/644,188, Non Final Office Action mailed Sep. 9, 2013", 9 pgs.
"U.S. Appl. No. 12/644,188, Non Final Office Action mailed Sep. 19, 2012", 8 pgs.
"U.S. Appl. No. 12/644,188, Notice of Allowance mailed Mar. 21, 2014", 5 pgs.
"U.S. Appl. No. 12/644,188, Response filed Feb. 19, 2013 to Non Final Office Action mailed Sep. 19, 2012", 6 pgs.
"U.S. Appl. No. 12/644,188, Response filed Jul. 22, 2013 to Final Office Action mailed May 22, 2013", 6 pgs.
"U.S. Appl. No. 12/644,188, Response filed Dec. 9, 2013 to Non Final Office Action mailed Sep. 9, 2013", 6 pgs.
"U.S. Appl. No. 12/842,305, Examiner Interview Summary mailed Apr. 19, 2013", 3 pgs.
"U.S. Appl. No. 12/842,305, Non Final Office Action mailed Jan. 17, 2014", 8 pgs.
"U.S. Appl. No. 12/842,305, Response filed Apr. 8, 2013 to Restriction Requirement mailed Feb. 8, 2013", 6 pgs.
"U.S. Appl. No. 12/842,305, Response filed Apr. 17, 2014 to Non Final Office Action mailedJan. 17, 2014", 9 pgs.
"U.S. Appl. No. 12/842,305, Restriction Requirement mailed Feb. 8, 2013", 6 pgs.

(56) References Cited

OTHER PUBLICATIONS

"U.S. Appl. No. 13/181,752, Final Office Action mailed Jul. 11, 2013", 7 pgs.
"U.S. Appl. No. 13/181,752, Non Final Office Action mailed Mar. 5, 2013", 7 pgs.
"U.S. Appl. No. 13/181,752, Notice of Allowance mailed Sep. 25, 2013", 9 pgs.
"U.S. Appl. No. 13/181,752, Response filed Jun. 5, 2013 to Non Final Office Action mailed Mar. 5, 2013", 8 pgs.
"U.S. Appl. No. 13/181,752, Response filed Sep. 11, 2013 to Final Office Action mailed Jul. 11, 2013", 8 pgs.
"U.S. Appl. No. 13/422,177, Advisory Action mailed Jun. 9, 2014", 3 pgs.
"U.S. Appl. No. 13/422,177, Final Office Action mailed Feb. 27, 2014", 12 pgs.
"U.S. Appl. No. 13/422,177, Non Final Office Action mailed Jul. 16, 2014", 12 pgs.
"U.S. Appl. No. 13/422,177, Non Final Office Action mailed Sep. 26, 2013", 10 pgs.
"U.S. Appl. No. 13/422,177, Notice of Allowance mailed Feb. 3, 2015", 8 pgs.
"U.S. Appl. No. 13/422,177, Response filed Apr. 28, 2014 to Final Office Action mailed Feb. 27, 2014", 9 pgs.
"U.S. Appl. No. 13/422,177, Response filed Oct. 16, 2014 to Non Final Office Action mailed Jul. 16, 2014", 10 pgs.
"U.S. Appl. No. 13/422,177, Response filed Dec. 20, 2013 to Non Final Office Action mailed Sep. 26, 2013", 8 pgs.
"U.S. Appl. No. 13/776,557, Final Office Action mailed Mar. 20, 2014", 8 pgs.
"U.S. Appl. No. 13/776,557, Non Final Office Action mailed Oct. 22, 2013", 6 pgs.
"U.S. Appl. No. 13/776,557, Notice of Allowance mailed Jun. 13, 2014", 8 pgs.
"U.S. Appl. No. 13/776,557, Response filed Jan. 22, 2014 to Non Final Office Action mailed Oct. 22, 2013", 6 pgs.
"U.S. Appl. No. 13/776,557, Response filed May 15, 2014 to Final Office Action mailed Mar. 20, 2014", 7 pgs.
"U.S. Appl. No. 14/257,537, Advisory Action mailed Jul. 14, 2016", 6 pgs.
"U.S. Appl. No. 14/257,537, Advisory Action mailed Oct. 21, 2015", 2 pgs.
"U.S. Appl. No. 14/257,537, Appeal Brief filed Oct. 27, 2016", 15 pgs.
"U.S. Appl. No. 14/257,537, Decision mailed Aug. 15, 2016 on Pre-Appeal Brief Request filed Jul. 27, 2016", 4 pgs.
"U.S. Appl. No. 14/257,537, Final Office Action mailed Apr. 27, 2016", 20 pgs.
"U.S. Appl. No. 14/257,537, Final Office Action mailed Aug. 3, 2015", 16 pgs.
"U.S. Appl. No. 14/257,537, Non Final Office Action mailed Mar. 19, 2015", 19 pgs.
"U.S. Appl. No. 14/257,537, Non Final Office Action mailed Nov. 17, 2015", 20 pgs.
"U.S. Appl. No. 14/257,537, Notice of Allowance mailed Jan. 13, 2017", 10 pgs.
"U.S. Appl. No. 14/257,537, Pre-Appeal Brief Request filed Jul. 27, 2016", 4 pgs.
"U.S. Appl. No. 14/257,537, Response filed Feb. 17, 2016 to Non Final Office Action mailed Nov. 17, 2015", 19 pgs.
"U.S. Appl. No. 14/257,537, Response filed Jun. 19, 2015 to Non Final Office Action mailed Mar. 19, 2015", 6 pgs.
"U.S. Appl. No. 14/257,537, Response filed Jun. 27, 2016 to Final Office Action mailed Apr. 27, 2016", 8 pgs.
"U.S. Appl. No. 14/257,537, Response filed Oct. 5, 2015 to Final Office Action mailed Aug. 3, 2015", 8 pgs.
"U.S. Appl. No. 14/257,537, Response filed Nov. 3, 2015 to Advisory Action mailed Oct. 21, 2015", 8 pgs.
"U.S. Appl. No. 14/301,103, Advisory Action mailed Jun. 10, 2016", 3 pgs.
"U.S. Appl. No. 14/301,103, Final Office Action mailed Mar. 25, 2016", 11 pgs.
"U.S. Appl. No. 14/301,103, Non Final Office Action mailed Dec. 2, 2015", 9 pgs.
"U.S. Appl. No. 14/301,103, Non-Final Office Action mailed Jul. 28, 2016", 10 pgs.
"U.S. Appl. No. 14/301,103, Notice of Allowance mailed Feb. 15, 2017", 8 pgs.
"U.S. Appl. No. 14/301,103, Preliminary Amendment Filed Jul. 1, 2014", 5 pgs.
"U.S. Appl. No. 14/301,103, Response filed Mar. 2, 2016 to Non Final Office Action mailed Dec. 2, 2015", 6 pgs.
"U.S. Appl. No. 14/301,103, Response filed May 25, 2016 to Final Office Action mailed Mar. 25, 2016", 7 pgs.
"U.S. Appl. No. 14/301,103, Response filed Oct. 28, 2016 to Non-Final Office Action mailed Jul. 28, 2016", 6 pgs.
"U.S. Appl. No. 14/512,560, Non Final Office Action mailed Jan. 29, 2016", 9 pgs.
"U.S. Appl. No. 15/595,302, Non Final Office Action mailed Nov. 30, 2017", 19 pgs.
"U.S. Appl. No. 15/595,302, Notice of Allowance mailed Apr. 11, 2018", 10 pgs.
"U.S. Appl. No. 15/595,302, Preliminary Amendment filed Jul. 24, 2017", 5 pgs.
"U.S. Appl. No. 15/595,302, Response filed Feb. 28, 2018 to Non Final Office Action mailed Nov. 30, 2017", 7 pgs.
"U.S. Appl. No. 15/632,742, Non Final Office Action mailed Feb. 7, 2018", 11 pgs.
"U.S. Appl. No. 15/632,742, Notice of Allowance mailed Nov. 28, 2018", 9 pgs.
"U.S. Appl. No. 15/632,742, Preliminary Amendment filed Sep. 5, 2017", 6 pgs.
"U.S. Appl. No. 15/632,742, Response Filed May 7, 2018 to Non Final Office Action mailed Feb. 7, 2018", 7 pgs.
"U.S. Appl. No. 16/058,335, Final Office Action mailed Mar. 28, 2019", 9 pgs.
"U.S. Appl. No. 16/058,335, Non Final Office Action mailed Oct. 11, 2018", 19 pgs.
"U.S. Appl. No. 16/058,335, Notice of Allowance mailed Jun. 6, 2019", 10 pgs.
"U.S. Appl. No. 16/058,335, Response Filed Jan. 11, 2019 to Non Final Office Action mailed Oct. 11, 2018", 8 pgs.
"U.S. Appl. No. 16/058,335, Response filed May 23, 2019 to Final Office Action mailed Mar. 28, 2019", 6 pgs.
"U.S. Appl. No. 16/377,643, Non Final Office Action mailed Oct. 10, 2019", 10 pgs.
"U.S. Appl. No. 16/377,643, Notice of Allowance mailed Jan. 24, 2020", 9 pgs.
"U.S. Appl. No. 16/377,643, Preliminary Amendment filed Jul. 22, 2019", 5 pgs.
"U.S. Appl. No. 16/377,643, Response filed Jan. 9, 2020 to Non Final Office Action mailed Oct. 10, 2019", 8 pgs.
"U.S. Appl. No. 16/377,643, Supplemental Notice of Allowability mailed Apr. 28, 2020", 2 pgs.
"U.S. Appl. No. 16/599,524, Final Office Action mailed Jan. 11, 2021", 15 pgs.
"U.S. Appl. No. 16/599,524, Non Final Office Action mailed Aug. 6, 2020", 25 pgs.
"U.S. Appl. No. 16/599,524, Notice of Allowance mailed Mar. 18, 2021", 9 pgs.
"U.S. Appl. No. 16/599,524, Preliminary Amendment filed Jan. 31, 2020", 5 pgs.
"U.S. Appl. No. 16/599,524, Response filed Mar. 3, 2021 to Final Office Action mailed Jan. 11, 2021", 6 pgs.
"U.S. Appl. No. 16/599,524, Response filed Nov. 5, 2020 to Non Final Office Action mailed Aug. 6, 2020", 8 pgs.
"U.S. Appl. No. 16/889,024, Non Final Office Action mailed Jun. 28, 2021", 12 pgs.
"U.S. Appl. No. 16/889,024, Notice of Allowance mailed Oct. 5, 2021", 9 pgs.
"U.S. Appl. No. 16/889,024, Preliminary Amendment filed Aug. 10, 2020", 5 pgs.

(56) References Cited

OTHER PUBLICATIONS

"U.S. Appl. No. 16/889,024, Response filed Sep. 23, 2021 to Non Final Office Action mailed Jun. 28, 2021", 8 pgs.
"U.S. Appl. No. 17/372,745, Advisory Action mailed Apr. 5, 2023", 3 pgs.
"U.S. Appl. No. 17/372,745, Final Office Action mailed Jan. 23, 2023", 27 pgs.
"U.S. Appl. No. 17/372,745, Non Final Office Action mailed Aug. 29, 2022", 23 pgs.
"U.S. Appl. No. 17/372,745, Notice of Allowance mailed May 8, 2023", 8 pgs.
"U.S. Appl. No. 17/372,745, Preliminary Amendment filed Sep. 23, 2021", 6 pgs.
"U.S. Appl. No. 17/372,745, Response filed Mar. 23, 2023 to Final Office Action mailed Jan. 23, 2023", 11 pgs.
"U.S. Appl. No. 17/372,745, Response filed Nov. 29, 2022 to Non Final Office Action mailed Aug. 29, 2022", 10 pgs.
"U.S. Appl. No. 17/650,793, Notice of Allowance mailed Mar. 7, 2023", 9 pgs.
"U.S. Appl. No. 17/650,793, Preliminary Amendment filed Apr. 22, 2022", 5 pgs.
"U.S. Appl. No. 18/332,281, Preliminary Amendment filed Aug. 18, 2023", 5 pgs.
"U.S. Appl. No. 16/058,335, Preliminary Amendment", 5 pgs.
"European Application Serial No. 12167845.2, Extended EP Search Report mailed Sep. 12, 2012", 6 pgs.
"European Application Serial No. 08253065.0, European Examination Notification mailed Oct. 11, 2011", 7 pgs.
"European Application Serial No. 08253065.0, European Office Action mailed Aug. 26, 2010", 6 Pgs.
"European Application Serial No. 08253065.0, Extended Search Report Mailed Dec. 15, 2008" 9 pgs.
"European Application Serial No. 08253065.0, Office Action mailed Jul. 17, 2009", 1 pg.
"European Application Serial No. 08253065.0, Response filed Jan. 26, 2010 to Office Action mailed Jul. 17, 2009", 9 pgs.
"European Application Serial No. 08253065.0, Response filed Feb. 8, 2012 to Examination Notification mailed Oct. 11, 2011", 15 pgs.
"European Application Serial No. 08253065.0, Response to Office Action filed Feb. 28, 2011 to European Office Action mailed Aug. 26, 2010", 17 pgs.
"European Application Serial No. 08725262.3, Appeal Decision mailed Jul. 29, 2013", 7 pgs.
"European Application Serial No. 08725262.3, EPO Written Decision to Refuse mailed Oct. 19, 2012", 14 pgs.
"European Application Serial No. 08725262.3, Office Action mailed Apr. 21, 2010", 6 Pgs.
"European Application Serial No. 08725262.3, Office Action mailed Aug. 5, 2011", 5 pgs.
"European Application Serial No. 08725262.3, Response filed Feb. 13, 2012 to Office Action mailed Aug. 5, 2011", 11 pgs.
"European Application Serial No. 08725262.3, Response Filed Nov. 2, 2010 to Office Action mailed Apr. 21, 2010", 14 pgs.
"European Application Serial No. 08725262.3, Summons to Attend Oral Proceedings mailed Jun. 6, 2012", 5 pgs.
"European Application Serial No. 09168844.0, European Search Report mailed Apr. 19, 2010", 3 Pgs.
"European Application Serial No. 09168844.0, Office Action mailed Apr. 8, 2013", 5 pgs.
"European Application Serial No. 09168844.0, Office Action mailed Apr. 28, 2011", 5 pgs.
"European Application Serial No. 09168844.0, Office Action mailed May 14, 2012", 2 pgs.
"European Application Serial No. 09168844.0, Office Action mailed May 3, 2010", 5 pgs.
"European Application Serial No. 09168844.0, Response filed Feb. 24, 2012 to Office Action mailed Apr. 28, 2011", 12 pgs.
"European Application Serial No. 09168844.0, Response filed Jul. 24, 2012 to Examination Notification Art. 94(3) mailed May 14, 2012", 10 pgs.
"European Application Serial No. 09168844.0, Response Filed Nov. 15, 2010 to Office Action mailed May 3, 2010", 8 pgs.
"European Application Serial No. 09250729.2, Extended Search Report Mailed Dec. 14, 2009", 4 pgs.
"European Application Serial No. 10251319.9, Office Action mailed Jan. 3, 2012", 6 pgs.
"European Application Serial No. 10251319.9, Response filed Jul. 24, 2012 to Extended European Search Report mailed Jan. 3, 2012", 10 pgs.
"European Application Serial No. 12160102.5, Communication Pursuant to Article 94(3) EPC mailed Jul. 17, 2018", 6 pgs.
"European Application Serial No. 12160102.5, Extended European Search Report mailed Sep. 7, 2016", 8 pgs.
"European Application Serial No. 12167845.2, Response filed Apr. 10, 2013 to Extended European Search Report mailed Sep. 12, 2012", 14 pgs.
"European Application Serial No. 09168844.0, Office Action mailed Sep. 4, 2012", 4 pgs.
"European Application Serial No. 09168844.0, Response filed Mar. 14, 2013 to Office Action mailed Sep. 4, 2012", 34 pgs.
"International Application Serial No. PCT/US2008/001609, International Preliminary Report on Patentability mailed Aug. 20, 2009", 10 pgs.
"International Application Serial No. PCT/US2008/001609, Search Report mailed Jun. 19, 2008", 7 pgs.
"International Application Serial No. PCT/US2008/001609, Written Opinion mailed Jun. 19, 2008", 8 pgs.
Buchoff, L S, "Advanced Non-Soldering Interconnection", Electro International, 1991 (IEEE), XP 10305250A1, (1991), 248-251.
Tondra, Mark, "Flow Assay With Integrated Detector", U.S. Appl. No. 60/887,609, filed Feb. 1, 2007, 28 pgs.
"U.S. Appl. No. 18/332,281, Notice of Allowance mailed Jun. 20, 2024", 9 pgs.

* cited by examiner

HEARING AID ADAPTED FOR EMBEDDED ELECTRONICS

PRIORITY AND RELATED APPLICATIONS

The application is a continuation of U.S. application Ser. No. 17/372,745, filed Jul. 12, 2021, which is a continuation of U.S. application Ser. No. 16/599,524, filed Oct. 11, 2019, now issued as U.S. Pat. No. 11,064,304 is a continuation of U.S. application Ser. No. 16/058,335, filed Aug. 8, 2018, now issued as U.S. Pat. No. 10,448,176, which is a continuation of U.S. application Ser. No. 15/595,302, filed May 15, 2017, now issued as U.S. Pat. No. 10,051,390, which is a continuation of U.S. application Ser. No. 14/257,537, filed Apr. 21, 2014, now issued as U.S. Pat. No. 9,654,887, which is a continuation of U.S. application Ser. No. 12/539,195, filed Aug. 11, 2009, now issued as U.S. Pat. No. 8,705,785, which application claims the benefit of priority under 35 U.S.C. 119(e) of U.S. Provisional Patent Application Ser. No. 61/087,899, filed Aug. 11, 2008, which applications are incorporated herein by reference in their entirety.

TECHNICAL FIELD

The present subject matter relates generally to hearing assistance devices and housings and in particular to method and apparatus for integration of electrical components with hearing assistance device housings.

BACKGROUND

Hearing assistance device manufacturers, including hearing aid manufacturers, have adopted thick film hybrid technologies that build up layers of flat substrates with semiconductor die and passive electronic components attached to each substrate. Manufacturing of such circuits employ technologies, such as, surface mount, flip-chip, or wire-bond that interconnect the various die. Conductors such as wires or flex circuits are attached to pads on the hybrid module after the hybrid module is assembled and tested. The conductors connect various electro-mechanical, electro-acoustical and electro-chemical devices to the active electronics within the hybrid. Connection points may be provided for a battery, receiver/speaker, switch, volume control, microphones, programming interface, external audio interface and wireless electronics including an antenna. Recent advances, such as the addition of wireless technology, have stressed designers' ability to accommodate additional advances using expanded hybrid circuits because of size limitations within a device housing. Growing the hybrid to add features, functions and new interfaces, increases the overall size and complexity of a hearing instrument. Expanding the current hybrid may not be a viable option since the hybrid circuit is made up of finite layers of rectangular planes. The larger, complex circuits compete with most manufacturers' goals of small and easy to use hearing assistance devices and hearing aids.

SUMMARY

The present subject matter relates to hearing aids comprising a microphone, a receiver, hearing aid electronics coupled to the microphone and the receiver and a conductive traces integrated with an insulator, the conductive traces adapted to interconnect the hearing aid electronics and to follow non-planar contours of the insulator. In some examples, the insulator includes a hearing aid housing and components of the hearing aid electronics embedded in the hearing aid housing. In some examples, the insulator includes a connector plug to connect a transducer to the hearing aid electronics. In some examples, the connector plug includes an embedded electrical device.

This Summary is an overview of some of the teachings of the present application and not intended to be an exclusive or exhaustive treatment of the present subject matter. Further details about the present subject matter are found in the detailed description and appended claims. The scope of the present subject matter is defined by the appended claims and their legal equivalents.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

The present subject matter provides apparatus and methods for using conductor on insulator technology to provide space saving, robust and consistent electronic assemblies. Although applicable to various types of electronics and electronic devices, examples are provided for hearing assistance devices. In various applications, the insulator is a plastic. In various applications the insulator is a ceramic. Other insulators are possible without departing from the scope of the present subject matter.

Figure 1A:
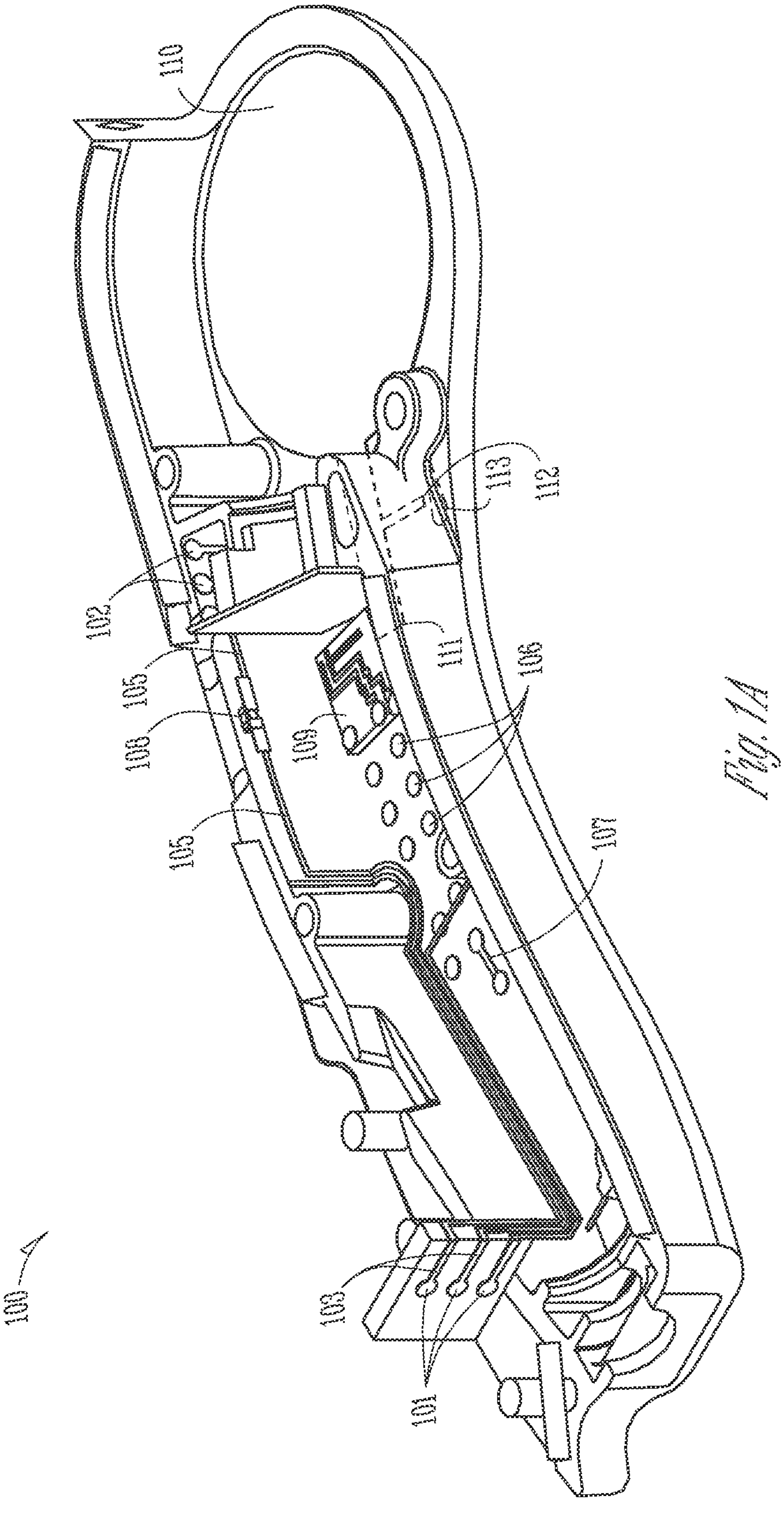
FIG. 1A illustrates a portion of a hearing assistance device housing according to one embodiment of the present subject matter.

FIG. 1A illustrates a portion 100 of a hearing assistance device housing 100 according to one embodiment of the present subject matter. The illustrated housing portion includes a number of conductor-on-insulator (COI) applications. Example applications of COI traces visible in FIG. 1 are contact pads 101, 102 and multi axis traces 103, connected to the contact pads 101. The multi axis traces 103 follow the tight contours of the housing and eliminate the need for bonding wires, a separate substrate, or both, to connect, for example, a transducer or a switch, to the hearing assistance electronics. In various embodiments, electrical components, such as transducers, sensors switches and surface mounted electronics, connect to the contact pads 101, 102 using conductive silicone. Conductive silicone reduces the need for solder and makes the replacement and service of electrical components in the hearing assistance device more efficient.

Figure 1B:
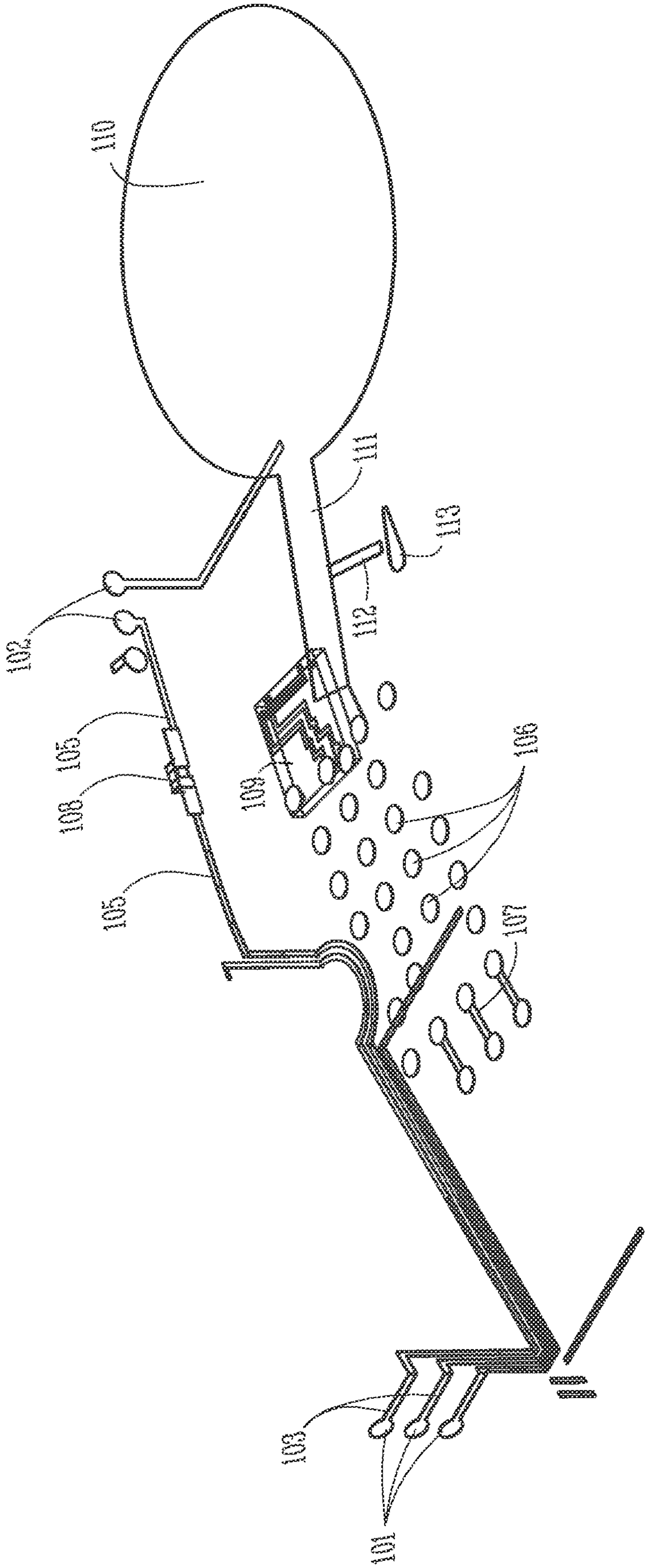
FIG. 1B shows a three dimensional view of the COI technologies present in the hearing assistance device housing of FIG. 1A according to one embodiment of the present subject matter without the plastic housing portion.

In the illustrated embodiment, portions of COI traces 105 lead to an integrated capacitor (see for example capacitor 108 on FIG. 1B). Integrating electrical components, such as passive components, with the housing of the hearing assistance device frees up area within the housing and provides additional design freedom to modify the size of the device or add additional features. It is understood that other integrated passive electrical components are possible without departing from the scope of the present subject matter.

This approach also allows the integration of ball grid array component bond pads 106 and connecting traces 107 with the device housing as demonstrated in FIG. 1A. The COI bond pads 106 and traces 107 reduce the need for an additional substrate and bond wires, thus freeing up space within the housing. Such designs can provide for one or more of: smaller housings, additional features, more streamlined manufacturing processes, and/or more consistent performance of the electronics of the device.

FIG. 1B shows a three dimensional view of the COI technologies present in the hearing assistance device housing of FIG. 1A without the plastic housing portion. FIG. 1B includes the multi axis traces 103 and bond pads 101, 102 integrated with the sidewalls of the housing. FIG. 1B also shows the position of the integrated capacitor 108 discussed above and the traces 105 connected to the capacitor. Additional bonding pads 106 for a ball grid array (BGA) component or other surface mounted electronics are illustrated in FIG. 1B. FIG. 1B demonstrates some additional options for design, including, but not limited to, an active component 109 integrated into the device housing, a large bonding pad 110 and distribution trace 111 for a battery, and an intercavity conductor 112 and contact pad 113. In one embodiment, active component 109 is a flip chip semiconductor die. Other design options are possible, and those shown herein are intended to demonstrate only some options and are not intended to be an exhaustive or exclusive set of design options.

Figure 2A:
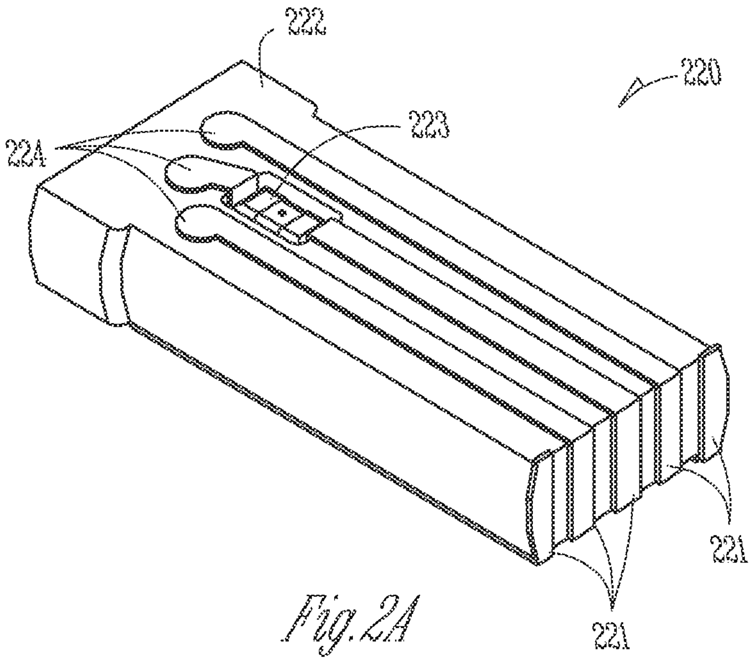
FIGS. 2A and 2B demonstrate various views of a COI application for components according to one embodiment of the present subject matter.
Figure 2B:
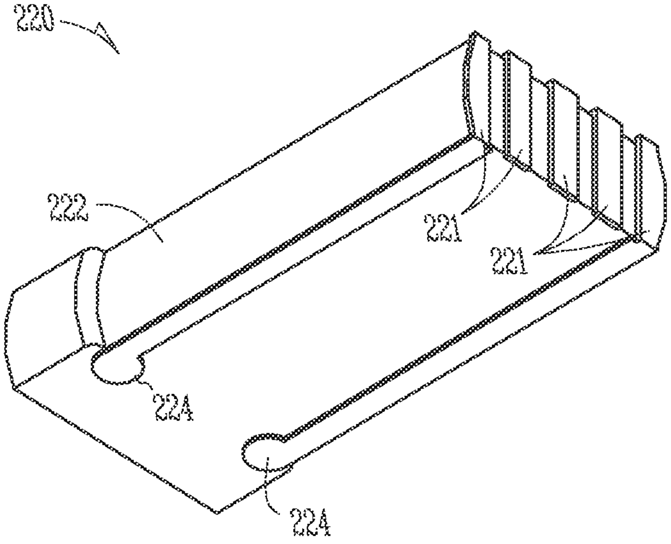

FIGS. 2A and 2B demonstrate various views of a COI application for components. In the example of FIGS. 2A and 2B a plug for a hearing assistance device is coated with conductive traces. In one embodiment, the plug is used with a receiver-in-the-canal (RIC) application, such as RIC plug 220. The plug includes a number of conductive traces 221 integrated with the plastic body 222. The illustrated plug is used to connect an OTE or BTE type housing to a RIC device. In this embodiment, the plug includes five (5) traces 221 and contact pads 224 to connect both a receiver (2 traces) and a microphone (3 traces). In the design shown, discrete components, such as a DC blocking capacitor 223 is integrated with the body of the plug. Available space of the plug is better utilized by embedding the passive component 223, in this example a microphone DC blocking capacitor. Integrating components, such as surface mounted electronics, into the plug body frees up volume within the housing of the hearing assistance device. The component 223 can be placed into a cavity with a connector or can be otherwise integrated into the connector using a variety of technologies. The capacitor 223 can either be placed into a cavity within a connector or the capacitor can be completely embedded within the connector using various technologies known in the art. For example, a technology called Microscopic Integrated Processing Technology (MIPTEC) available from Panasonic integrates 3-dimensional conductive elements about the surface of various injection molded components. The process includes molding one or more articles, thinly metalizing one or more surfaces using sputter deposition, for example, laser etching conductor patterns in the metallization layer, electroplating the conductors with copper, etching to remove excess metallization material and then electroplating additional conductive material such as nickel and aluminum to form the finished conductors. The process is used to form 3-dimensional conductive traces on plastic and ceramic insulators. Additional technologies, including various Molded Interconnect Device (MID) technologies, are available for integrating and embedding electrical circuit and circuit components with a housing, including, but not limited to, the process described in U.S. Patent Publication 2006/0097376, Leurs, et al., and incorporated by reference herein in its entirety.

Referring again to FIGS. 2A and 2B, in various embodiments, a hearing assistance system includes two plugs. One plug connects wires to the receiver, or RIC device, and the other connects the wires to the housing enclosing the hearing assistance electronics. In various embodiments, conductive silicone is used to electrically connect the plug with the corresponding circuits in a mated connector.

For hearing assistance devices, COI technology provides some benefits including, but not limited to, one or more of: tightly controlled and consistent radio frequency (RF) characteristics due to consistent circuit placement; reduced feedback and/or repeatable feedback performance due to precise transducer lead location; efficient production with substantially fewer manufacturing steps including elimination of manual soldering, wire routing, and related, traditional electronic assembly operations, smaller hearing instruments; possible elimination of wires; possible elimination of the traditional PCB or thick film ceramic substrate; and possibly smaller and/or less expensive hearing instrument components. Such components include, but are not limited to RIC connectors, DAI modules, capacitive switches, or antenna modules.

Examples of hearing assistance device designs benefiting from COI technologies include, but are not limited to, behind-the-ear (BTE) and over-the-ear (OTE) designs as well as the faceplates of in-the-ear (ITE), in-the-canal (ITC) and completely-in-the-canal (CIC) designs. Any hearing assistance device housing and/or connectors can benefit from the teachings provided herein. In a hearing assistance device housing, for example, DSP, memory, and RF semiconductor dies can be flip chip attached and integrated with the hearing instrument housing or spine along with passive components, battery contacts, interconnecting conductor traces, RF antenna, and transducer connectors to reduce the assembly process of the hearing assistance device.

It will be understood by those of ordinary skill in the art, upon reading and understanding the present subject matter that COI technology includes, but is not limited to, conductor-on-plastic (COP) or conductor-on-ceramic (COC) processes, for example. Technologies have been developed, as discussed above, which enable formation of conductive patterns either on or embedded within uniquely shaped plastic or ceramic substrates. Such processes facilitate production of electronic assemblies or components integrated with uniquely shaped plastic or ceramic substrate structures.

The present subject matter includes hearing assistance devices, including, but not limited to, cochlear implant type hearing devices, hearing aids, such as behind-the-ear (BTE), in-the-ear (ITE), in-the-canal (ITC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in-the-canal. It is understood that other hearing assistance devices not expressly stated herein may fall within the scope of the present subject matter.

This application is intended to cover adaptations and variations of the present subject matter. It is to be understood that the above description is intended to be illustrative, and not restrictive. The scope of the present subject matter should be determined with reference to the appended claim, along with the full scope of equivalents to which the claims are entitled.

What is claimed is:

1. A hearing aid configured to be worn in an ear of a wearer, the hearing aid comprising:
- a microphone;
- a receiver;
- hearing aid electronics coupled to the microphone and the receiver; and
- conductive traces overlaying an insulator, the conductive traces configured to transmit or receive wireless signals and configured to follow non-planar contours of the insulator.

2. The hearing aid of claim 1, wherein the conductive traces are configured to connect the hearing aid electronics to one or more of the microphone or the receiver.

3. The hearing aid of claim 1, wherein the insulator includes at least a portion of a housing of the hearing aid.

4. The hearing aid of claim 1, comprising a passive electrical component coupled to one or more of the conductive traces.

5. The hearing aid of claim 1, comprising an active electrical component coupled to one or more of the conductive traces.

6. The hearing aid of claim 1, wherein the hearing aid electronics include a plurality of electronic devices, and
- wherein an electronic device of the plurality of electronic devices is embedded in the insulator and coupled to one or more of the conductive traces.

7. The hearing aid of claim 6, wherein the electronic device includes a passive surface mount device.

8. The hearing aid of claim 6, wherein the electronic device includes an active device.

9. The hearing aid of claim 1, comprising a contact pad trace array integrated with the insulator, the contact pad trace array having a contact array pattern coupled to the conductive traces and configured to receive an electrical component having a ball grid array (BGA) type packaging.

10. The hearing aid of claim 1, wherein the conductive traces are configured to connect to an antenna.

11. The hearing aid of claim 1, wherein the insulator includes a plastic or a ceramic.

12. The hearing aid of claim 1, wherein the hearing aid is an in-the-ear hearing aid.

13. The hearing aid of claim 1, wherein the hearing aid is an in-the-canal hearing aid.

14. The hearing aid of claim 1, wherein the hearing aid is a completely-in-the-canal hearing aid.

15. The hearing aid of claim 1, wherein the insulator includes a plurality of internal cavities and the conductive traces include an inter-cavity trace configured to electrically interconnect hearing assistance electronics disposed within at least two of the plurality of internal cavities.

16. A method of manufacturing a hearing aid configured to be worn in an ear of a wearer, the method comprising:
- overlaying conductive traces on an insulator of the hearing aid, the conductive traces configured to transmit or receive wireless signals and configured to follow non-planar contours of the insulator.

17. The method of claim 16, wherein overlaying conductive traces includes overlaying multi-axis conductive traces using Molded Interconnect Device (MID) technology.

18. The method of claim 16, wherein overlaying conductive traces includes using conductor-on-insulator (COI) traces.

19. The method of claim 16, further comprising integrating a contact pad trace array with the insulator, the contact pad trace array having a contact array pattern coupled to the conductive traces and configured to receive an electrical component having a ball grid array (BGA) type packaging.

20. The method of claim 18, wherein the insulator includes at least a portion of a housing of the hearing aid.

* * * * *